US007866034B2

(12) United States Patent
Salbach

(10) Patent No.: US 7,866,034 B2
(45) Date of Patent: Jan. 11, 2011

(54) TRIAXIAL CONNECTOR RELEASE TOOL

(76) Inventor: Richard Salbach, 2331 Leaf Ct., Sanford, FL (US) 32771

( * ) Notice: Subject to any disclaimer, the term of this patent is extended or adjusted under 35 U.S.C. 154(b) by 493 days.

(21) Appl. No.: 11/959,099

(22) Filed: Dec. 18, 2007

(65) Prior Publication Data

US 2009/0151155 A1 Jun. 18, 2009

(51) Int. Cl.
*B23P 19/00* (2006.01)

(52) U.S. Cl. ............................ 29/762; 29/747; 29/758; 29/770

(58) Field of Classification Search ................... 29/762, 29/747–750, 753, 754, 758, 759, 770, 854, 29/857; 439/580
See application file for complete search history.

(56) References Cited

U.S. PATENT DOCUMENTS 3,982,060 A * 9/1976 Avery et al. ............... 174/75 C
6,811,432 B2 * 11/2004 Cabalka et al. .......... 439/540.1

* cited by examiner

*Primary Examiner*—Thiem Phan
(74) *Attorney, Agent, or Firm*—ShuffieldLowman; Matthew G. McKinney

(57) ABSTRACT

A triaxial connector release tool comprising an outer housing and an inner appliance. The shape and size of appliance is adapted to fit concentrically within the housing of the tool. The appliance is pivotally mounted to the housing of the tool about a tab. In use, the tool is placed over the female and male triaxial connectors whereby a first end of the housing rests against an annular shoulder of a connector to provide resistance when the tool is in use. A user grasps the tool about the housing and exerts an inward squeezing force so that a pair of flanges of the appliance depress the protrusions of the locking mechanism of the male connector until they are disengaged from the apertures of the female connector and allowing the male connector to easily slide back out of the female connector.

20 Claims, 3 Drawing Sheets

TRIAXIAL CONNECTOR RELEASE TOOL

BACKGROUND OF THE INVENTION

1. Field of the Invention

The present invention relates generally to triaxial video cable connectors, and more specifically to a tool that facilitates the uncoupling of a male and female triaxial connector.

2. Description of the Prior Art

Triaxial cable is a type of electrical cable similar to coaxial cable but with the addition of an extra layer of insulation and a second conducting sheath. Triaxial cable provides greater bandwidth and a better signal than coaxial cable. It is most commonly used in the television industry as a connecting cable between a camera and its camera control unit. The camera control unit is typically located in a remote production control room or vehicle and controls various technical functions of the camera. The camera control unit can send camera control information such as exposure settings, intercom, return audio and video, and a signal alerting the camera operator that his camera is on the air. The camera control unit also provides power for the camera. Therefore, the camera operator is able to concentrate on filming the action and allows the technical director of the production control room to provide quality control and ensure uniformity between the video of all the cameras. The camera control unit provides the external connections for the camera to other studio equipment, such as the vision mixer and intercom system.

Many sports arenas and other similar venues have triaxial cables installed permanently proximate from the parking area for television production trucks outside of an arena to common camera locations throughout the arena. This allows a shorter and easier workday for visiting television crews who can simply connect to existing triaxial cable runs instead of having to run their own and remove them after each event.

The triaxial cables are joined together using quick connectors that include a male connector and a female connector. The male connector is secured within the female connector using a locking mechanism. The locking mechanism typically includes a pair of radially and angularly disposed protrusions, which extend outward from the male connector and are adapted to be removably seated within apertures of the female connector. In use, as the male connector is inserted through the open end of the female connector, the extending protrusions are deflected inwardly toward the axial centerline of the male connector. The male connector is slid into the female connector until the protrusions are aligned with the apertures of the female connector, at which time the protrusions snap outwardly and are seated within the apertures of the female connector. The protrusions of the male connector are visible and accessible through the apertures when the connectors are in proper alignment. The triaxial cables are then in securing engagement so that the triaxial cables resist separation or inadvertent pull out of the male connector from the female connector.

In order to separate the male and female connectors, it is necessary to depress the protrusions inwardly by squeezing so that the protrusions are disengaged from the apertures of the female connector and allowing the male connector to slide back out of the female connector. It is often difficult for a user to apply sufficient squeezing force to depress the protrusions inward a sufficient distance to clear the apertures of the female connector, thereby preventing the connectors from being easily separated when desired.

Accordingly, what is needed in the art is a triaxial connector release tool that facilitates the easy disengagement of a male and female triaxial connector.

Another need exists in the art for a triaxial connector release tool that is easy to use, durable and economical.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

This invention is a triaxial connector release tool comprising an outer housing and an inner appliance. The housing includes an arcuate housing top portion with opposing housing sidewalls extending from the housing top portion. A first slot and a second slot are disposed proximate to a first end of the housing top portion. The appliance of the tool includes an arcuate appliance top portion with opposing appliance sidewalls extending from the appliance top portion. The shape and size of appliance is adapted to fit concentrically within the housing of the tool. A tab extends from a first end of the appliance top portion and is disposed to pass through the first slot or the second slot of the housing for the tool. The appliance is placed concentrically adjacent to the housing and the tab is slidingly placed through either the first slot or the second slot of the housing. A ring is secured through the appliance aperture so that the tab is biased against passing back through the slots of the housing. Accordingly, the appliance is pivotally mounted to the housing of the tool about the tab. The first slot of the housing and second slot allow the tool to be adjustable depending on the application and size of the connectors.

A first flange depends from a first appliance sidewall and a matching second flange depends from a second appliance sidewall. The appliance flanges are disposed inwardly and perpindular to their respective sidewalls and adapted to depress protrusions on a locking mechanism of a male connector secured within a female connector. The arcuate appliance top portion is adapted and sized to have a slightly larger diameter than a female triaxial cable connector.

In use, the tool is placed over the female and male connectors whereby a first end of the housing rests against an annular shoulder of either the male connector or female connector to provide resistance when the tool is in use and substantially aligns the flanges with the protrusions of the locking mechanism. A user grasps the tool about the housing and exerts an inward squeezing force so that the flanges of appliance depress the protrusions of the locking mechanism until they are disengaged from the apertures of the female connector and allowing the male connector to easily slide back out of the female connector.

It is therefore a primary object of the invention to provide a triaxial connector removal tool that facilitates the easy disengagement of a male and female triaxial connector.

Another object of the present invention is to provide a triaxial connector removal tool that is easy to use, durable and economical.

These and other important objects, advantages, and features of the invention will become clear as this description proceeds.

The present invention, accordingly, comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
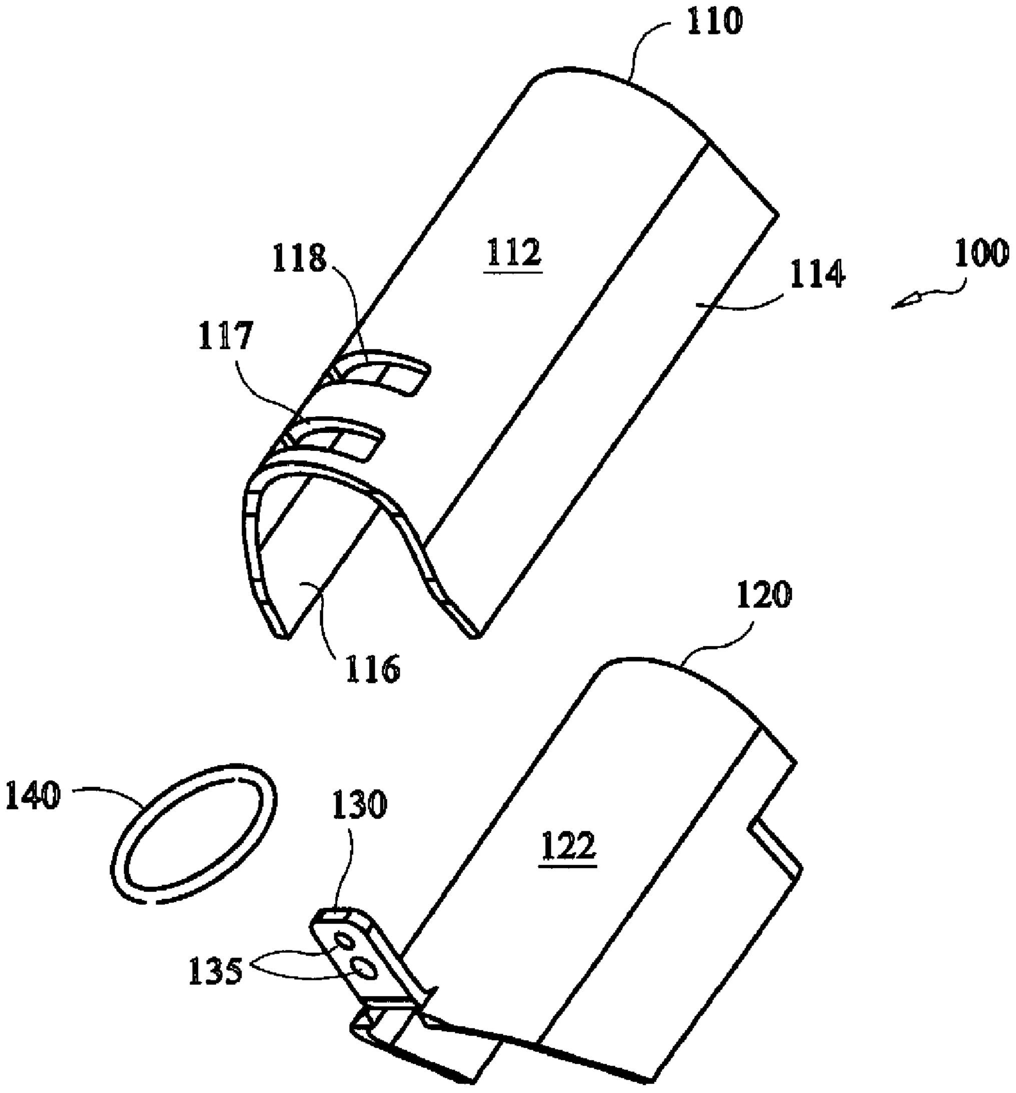
FIG. 1 is a front exploded perspective view of the triaxial connector release tool showing an embodiment of the present invention.

Referring now to FIG. 1, shows an exploded view of the triaxial connector release tool 100 of the present invention. Tool 100 includes an outer housing 110 and an inner appliance 120. Housing 110 includes an arcuate housing top portion 112 with opposing housing sidewalls 114, 116 extending from housing top portion 112. A first slot 117 and second slot 118 are disposed proximate a first end of housing top portion 112. Appliance 120 of tool 100 includes an arcuate appliance top portion 122 with opposing appliance sidewalls 124, 126 extending from appliance top portion 122 and each having a first end and a second end. The shape and size of appliance 122 is adapted to fit concentrically within housing 110. Tab 130 extends from a first end of appliance top portion 122 and is disposed to pass through first slot 117 or second slot 118 of housing 110.

Appliance 120 is placed concentrically adjacent to housing 110 and tab 130 is slidingly placed through either first slot 117 or second slot 118 and ring 140 is secured through appliance aperture 135 so that tab 130 is biased against passing back through slots 117, 118. Once ring 140 is secured, appliance 120 is pivotally mounted to housing 110 about tab 130. First slot 117 and second slot 118 allow tool 100 to be adjustable depending on the application and size of the particular connectors.

Figure 2:
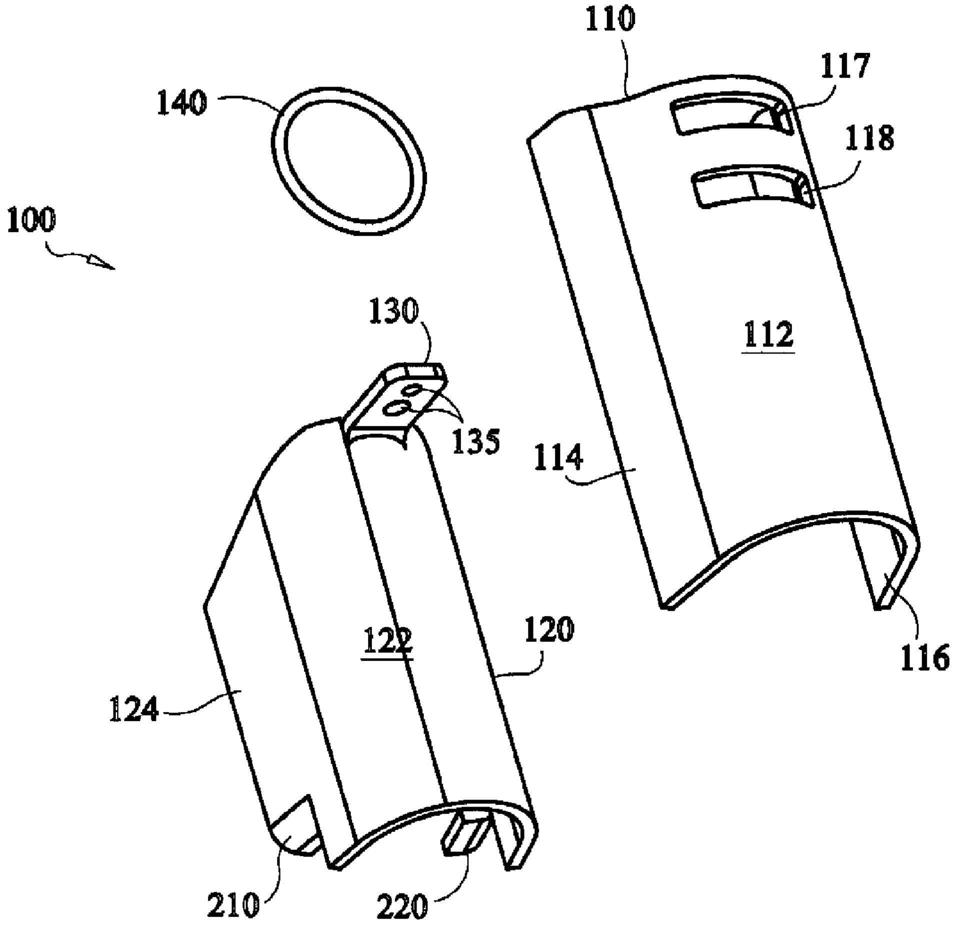
FIG. 2 is a rear exploded perspective view of the triaxial connector release tool showing an embodiment of the present invention.

Appliance 120 is used to interface with the protrusions of the locking mechanism on a male connector using pair of flanges 210, 220 shown in FIG. 2. A first flange 210 depends from the second end of appliance sidewall 124 and a matching second flange 220 depends from the second end of appliance sidewall 126. In the preferred embodiment, flanges 210, 220 are disposed inwardly and perpindular to respective sidewalls 124, 126 and adapted to depress protrusions on a locking mechanism of a male connector secured within a female connector. Arcuate appliance top portion 112 is adapted and sized to have a slightly larger diameter than a female triaxial cable connector.

Figure 3:
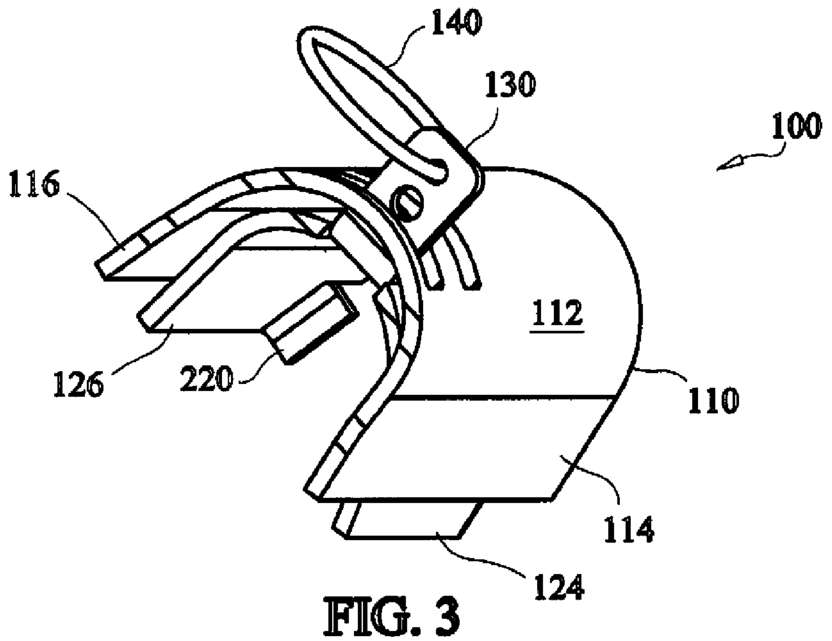
FIG. 3 is a front perspective view of the triaxial connector release tool in accordance with an embodiment of the present invention.
Figure 4:
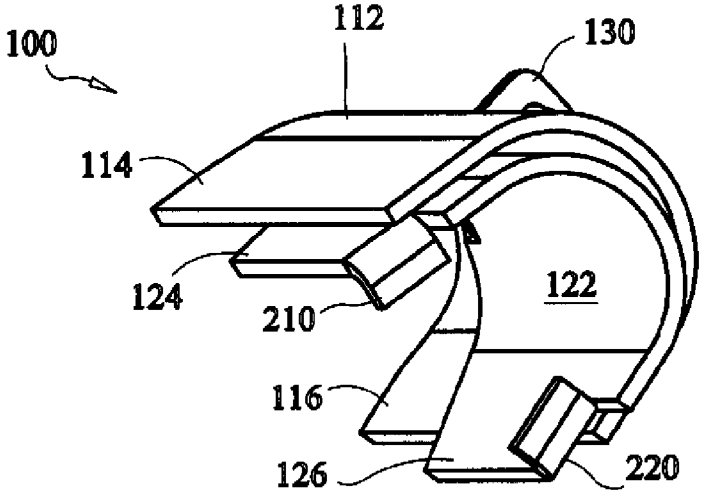
FIG. 4 is a rear perspective view of the triaxial connector release tool in accordance with an embodiment of the present invention.

Referring now to FIG. 3 and FIG. 4, appliance 120 and housing 110 are mated via tab 130, which is slidingly engaged by slot 117. In use, tool 100 is placed over the female and male connectors. A first end of housing 110 rests against an annular shoulder of either the male connector or female connector to provide resistance when the tool is in use and substantially aligns flanges 210, 220 with the protrusions of the locking mechanism. In alternative embodiments, housing 110 includes a clamp for securing around a cable to provide resistance when the tool is in use. A user grasps tool 100 about housing 110 and exerts an inward squeezing force so that flanges 210, 220 of appliance 120 depress the protrusions of the locking mechanism until they are disengaged from the apertures of the female connector and allowing the male connector to slide back out of the female connector.

There are various alternative embodiments, which may be adopted and incorporated in tool 100. For example, the shape, position and/or placement of flanges 210, 220 from appliance 120 may be varied. The size of the housing arcuate top portion 112 and appliance arcuate top portion 122 may be varied. Appliance sidewalls 124, 126 may be reduced in size to reduce material and thereby reducing costs of tool 100. The attachment of housing 110 to appliance 120 may be a hinge or other similar type of rotatable or pivotal mechanism. Tool 100 may be comprised of a metal material, plastic material, or a combination of a variety of materials.

Accordingly, the particular embodiments disclosed above and in the drawings are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall there between.

Now that the invention has been described,

What is claimed is:

1. A triaxial cable connector release tool, comprising:

an outer housing having an arcuate housing top portion with a pair of opposing housing sidewalls extending from the periphery of the housing top portion;

an inner appliance pivotally mounted to the outer housing and having an arcuate appliance top portion with a first appliance sidewall and a second appliance sidewall extending from the periphery of the appliance top portion wherein the size and shape of the appliance is adapted to fit concentrically within the housing; and a first flange depending from the first appliance sidewall and a matching second flange depending from the second appliance sidewall wherein the first flange and second flange are adapted to depress protrusions on a locking mechanism of a male triaxial connector secured within a female triaxial connector.

2. The triaxial connector release tool of claim 1 wherein the housing further comprising a first slot disposed proximate a first end of the housing top portion.

3. The triaxial connector release tool of claim 2 wherein the appliance further comprising a tab extending from a first end of the appliance top portion and disposed to pass through the first slot of the housing wherein the appliance is pivotally mounted to the housing about the tab of the appliance.

4. The triaxial connector release tool of claim 3 further comprising a retaining ring secured through an appliance aperture disposed on the tab so that the tab is biased against passing back through the first slot of the housing.

5. The triaxial connector release tool of claim 4 further comprising a second slot so that the tool is adjustable depending on the application and size of a particular connector.

6. The triaxial connector release tool of claim 1 wherein the arcuate appliance top portion is adapted and sized to have a slightly larger diameter than a female triaxial cable connector.

7. The triaxial connector of claim 6 wherein a first end of the housing is adapted to rest against an annular shoulder of either a male triaxial connector or a female triaxial connector so that resistance is provided when the tool is in use and substantially aligns the first flange and second flange with the protrusions of the locking mechanism.

8. A triaxial cable connector release tool, comprising:

an outer housing having an arcuate housing top portion with a pair of opposing housing sidewalls extending from the periphery of the housing top portion; wherein the housing further comprising a first slot disposed proximate a first end of the housing top portion;

an inner appliance pivotally mounted to the outer housing and having an arcuate appliance top portion with a first appliance sidewall and a second appliance sidewall extending from the periphery of the appliance top portion; wherein the appliance further comprising a tab extending from a first end of the appliance top portion and disposed to pass through the first slot of the housing wherein the appliance is pivotally mounted to the housing about the tab of the appliance; and a first flange depending from the first appliance sidewall and a matching second flange depending from the second appliance sidewall wherein the first flange and second flange are adapted to depress protrusions on a locking mechanism of a male triaxial connector secured within a female triaxial connector; wherein a first end of the housing is adapted to rest against an annular shoulder of either a male triaxial connector or a female triaxial connector so that resistance is provided when the tool is in use and substantially aligns the first flange and second flange with the protrusions of the locking mechanism.

9. The triaxial connector release tool of claim 8 further comprising a retaining ring secured through an appliance aperture disposed on the tab so that the tab is biased against passing back through the first slot of the housing.

10. The triaxial connector release tool of claim 9 further comprising a second slot so that the tool is adjustable depending on the application and size of a particular connector.

11. The triaxial connector release tool of claim 10 wherein the arcuate appliance top portion is adapted and sized to have a slightly larger diameter than a female triaxial cable connector.

12. The triaxial connector release tool of claim 11 wherein the first flange and the second flange are disposed inwardly and perpindular to respective first appliance sidewall and second appliance sidewall and adapted to depress protrusions on the locking mechanism of the male connector secured within the female connector.

13. A triaxial cable connector release tool, comprising:

an outer housing having a housing top portion with a pair of opposing housing sidewalls extending from the periphery of the housing top portion and adapted to slidingly engage over a triaxial connector;

an inner appliance attached to the outer housing and having an appliance top portion with a first appliance sidewall and a second appliance sidewall extending from the periphery of the appliance top portion; and a pair of flanges depending from the inner appliance adapted to engage protrusions on a locking mechanism of a electrical connector secured within a female electrical connector.

14. The triaxial connector release tool of claim 13 wherein the housing further comprising a plurality of slots and disposed proximate a first end of the housing top portion.

15. The triaxial connector release tool of claim 14 further comprising a hinge for attaching the housing and appliance together.

16. The triaxial connector release tool of claim 15 wherein the tool is comprised of metal.

17. The triaxial connector release tool of claim 16 wherein the tool is comprised of plastic.

18. The triaxial connector release tool of claim 15 wherein the appliance top portion is arcuate in shape.

19. The triaxial connector release tool of claim 15 wherein the housing is adapted to clamp around a cable so that resistance is provided when the tool is in use to prevent the housing from sliding out of position.

20. The triaxial connector release tool of claim 15 wherein the position of the first flange and the second flange is adjustable so that the tool is adaptable for use with a plurality of electrical connectors.

* * * * *